(12) United States Patent
Kilian et al.

(10) Patent No.: US 8,271,769 B2
(45) Date of Patent: *Sep. 18, 2012

(54) DYNAMIC ADAPTATION OF A CONFIGURATION TO A SYSTEM ENVIRONMENT

(75) Inventors: Frank Kilian, Mannheim (DE); Ingo Zenz, Epfenbach (DE)

(73) Assignee: SAP AG, Walldorf (DE)

( * ) Notice: Subject to any disclaimer, the term of this patent is extended or adjusted under 35 U.S.C. 154(b) by 1379 days.

This patent is subject to a terminal disclaimer.

(21) Appl. No.: 11/322,969

(22) Filed: Dec. 30, 2005

(65) Prior Publication Data

US 2007/0156389 A1    Jul. 5, 2007

(51) Int. Cl.
G06F 9/00 (2006.01)
G06F 9/24 (2006.01)
G06F 15/177 (2006.01)
G06F 1/24 (2006.01)

(52) U.S. Cl. ............................................. 713/1; 713/100

(58) Field of Classification Search ................ 713/1, 100
See application file for complete search history.

(56) References Cited

U.S. PATENT DOCUMENTS

| | | | |
|---|---|---|---|
| 5,165,018 A * | 11/1992 | Simor | 709/222 |
| 5,479,599 A | 12/1995 | Rockwell et al. | |
| 5,608,865 A | 3/1997 | Midgely et al. | |
| 5,758,154 A | 5/1998 | Qureshi | |
| 5,832,503 A | 11/1998 | Malik et al. | |
| 5,996,012 A | 11/1999 | Jarriel | |
| 6,041,347 A | 3/2000 | Harsham et al. | |
| 6,055,227 A | 4/2000 | Lennert et al. | |
| 6,148,277 A | 11/2000 | Asava et al. | |
| 6,161,176 A | 12/2000 | Hunter et al. | |
| 6,209,018 B1 | 3/2001 | Ben-Shachar et al. | |
| 6,314,460 B1 | 11/2001 | Knight et al. | |
| 6,341,372 B1 | 1/2002 | Datig | |
| 6,397,378 B1 | 5/2002 | Grey et al. | |
| 6,421,719 B1 | 7/2002 | Lewis et al. | |
| 6,490,690 B1 | 12/2002 | Gusler et al. | |
| 6,735,691 B1 | 5/2004 | Capps et al. | |
| 6,832,298 B2 * | 12/2004 | Fujii et al. | 711/147 |
| 6,871,221 B1 | 3/2005 | Styles | |
| 6,898,703 B1 | 5/2005 | Ogami et al. | |
| 6,925,646 B1 | 8/2005 | Korenshtein et al. | |
| 6,950,931 B2 * | 9/2005 | Wedlake | 713/2 |
| 6,996,517 B1 | 2/2006 | Papaefstathiou | |
| 7,054,924 B1 | 5/2006 | Harvey et al. | |

(Continued)

FOREIGN PATENT DOCUMENTS

EP        1486867        12/2004

(Continued)

OTHER PUBLICATIONS

Symantec, "Norton Ghost User's Guide", 1999, 138 pages.*

(Continued)

Primary Examiner — Suzanne Lo
(74) Attorney, Agent, or Firm — Schwegman Lundberg & Woessner P.A.

(57) ABSTRACT

A method and apparatus for dynamic adaptation of a configuration to a system environment. An embodiment of a method includes obtaining system information for a system. The system information is stored in a memory. A setting of an abstract configuration for the system is resolved, with the resolution of the setting being based at least in part on the system information.

16 Claims, 5 Drawing Sheets

U.S. PATENT DOCUMENTS

| | | | |
|---|---|---|---|
| 7,167,974 | B2 | 1/2007 | Roth et al. |
| 7,188,335 | B1 | 3/2007 | Darr et al. |
| 7,246,244 | B2 * | 7/2007 | Nanavati et al. ............. 713/186 |
| 7,246,345 | B1 | 7/2007 | Sharma et al. |
| 7,260,818 | B1 | 8/2007 | Iterum et al. |
| 7,320,007 | B1 | 1/2008 | Chang |
| 7,343,601 | B2 | 3/2008 | Azagury et al. |
| 7,373,661 | B2 | 5/2008 | Smith et al. |
| 7,412,687 | B2 | 8/2008 | Goodwin et al. |
| 7,447,701 | B2 | 11/2008 | Agarwal et al. |
| 7,480,643 | B2 | 1/2009 | Barsness et al. |
| 7,793,087 | B2 * | 9/2010 | Zenz et al. ........................ 713/1 |
| 7,797,522 | B2 | 9/2010 | Zenz et al. |
| 2003/0041235 | A1 | 2/2003 | Meyer |
| 2003/0055529 | A1 | 3/2003 | Aosawa |
| 2003/0221094 | A1 | 11/2003 | Pennarun |
| 2003/0225867 | A1 | 12/2003 | Wedlake |
| 2004/0117452 | A1 | 6/2004 | Lee et al. |
| 2004/0162930 | A1 | 8/2004 | Forin et al. |
| 2004/0187140 | A1 | 9/2004 | Aigner et al. |
| 2004/0205584 | A1 | 10/2004 | Pezzanite et al. |
| 2004/0230787 | A1 | 11/2004 | Blumenau et al. |
| 2005/0005005 | A1 | 1/2005 | Styles et al. |
| 2005/0050175 | A1 | 3/2005 | Fong et al. |
| 2005/0065993 | A1 | 3/2005 | Honda et al. |
| 2005/0071195 | A1 | 3/2005 | Cassel et al. |
| 2005/0085937 | A1 | 4/2005 | Goodwin et al. |
| 2005/0144428 | A1 | 6/2005 | Rothman et al. |
| 2005/0144528 | A1 | 6/2005 | Bucher et al. |
| 2005/0144610 | A1 | 6/2005 | Zenz |
| 2005/0240667 | A1 | 10/2005 | Koegel |
| 2005/0289169 | A1 | 12/2005 | Adya et al. |
| 2006/0041595 | A1 | 2/2006 | Taguchi et al. |
| 2006/0041881 | A1 | 2/2006 | Adkasthala |
| 2006/0047798 | A1 | 3/2006 | Feinleib et al. |
| 2006/0064673 | A1 | 3/2006 | Rogers et al. |
| 2006/0123409 | A1 | 6/2006 | Jordan, III et al. |
| 2006/0150178 | A1 | 7/2006 | Jerrard-Dunne et al. |
| 2006/0165123 | A1 | 7/2006 | Jerrard-Dunne et al. |
| 2006/0190579 | A1 | 8/2006 | Rachniowski et al. |
| 2006/0242626 | A1 | 10/2006 | Pham et al. |
| 2006/0242634 | A1 * | 10/2006 | Fleischer et al. ............. 717/148 |
| 2007/0094359 | A1 | 4/2007 | Lamoureux |
| 2007/0118654 | A1 | 5/2007 | Jamkhedkar et al. |
| 2007/0118888 | A1 | 5/2007 | Styles |
| 2007/0143480 | A1 | 6/2007 | Arroyo et al. |
| 2007/0156388 | A1 | 7/2007 | Kilian et al. |
| 2007/0156432 | A1 | 7/2007 | Mueller et al. |
| 2007/0156641 | A1 | 7/2007 | Mueller |
| 2007/0156715 | A1 | 7/2007 | Mueller |
| 2007/0156717 | A1 | 7/2007 | Zenz et al. |
| 2007/0157010 | A1 | 7/2007 | Zenz |
| 2007/0157172 | A1 | 7/2007 | Zenz et al. |
| 2007/0157185 | A1 | 7/2007 | Semerdzhiev |
| 2007/0162892 | A1 | 7/2007 | Zenz et al. |
| 2007/0165937 | A1 | 7/2007 | Markov et al. |
| 2007/0168965 | A1 | 7/2007 | Zenz et al. |
| 2007/0257715 | A1 | 11/2007 | Semerdzhiev et al. |

FOREIGN PATENT DOCUMENTS

| | | |
|---|---|---|
| GB | 2374687 | 10/2002 |
| WO | WO-96/26588 | 8/1996 |
| WO | WO-2004109978 | 12/2004 |
| WO | WO-2005/045670 | 5/2005 |
| WO | WO-2005045670 | 5/2005 |
| WO | WO-2007076944 A1 | 7/2007 |

OTHER PUBLICATIONS

Cowart et al. Special Edition Using Microsoft Windows XP Professional, Third Edition, Chapter 25, Dec. 6, 2004, 15 pages.*

Sanderson, Bruce. "RAM, Virtual Memory, Pagefile and all that stuff", Dec. 12, 2004, 5 pages, accessible at http://support.microsoft.com/kb/555223.*

PCT/EP2006/012356 *International Search Report and Written Opinion* Mailed Mar. 29, 2007.

Int'l Application No. PCT/EP2006/012357 *Int'l Search Report and Written Opinion* mailed Mar. 29, 2007.

Int'l Application No. PCT/EP2006/012358 *Int'l Search Report & Written Opinion* dated Jun. 14, 2007; 5 pgs.

Int'l Application No. PCT/EP2006/012421, *Int'l Search Report & Written Opinion* dated Oct. 2, 2007; 14 pages.

Anonymous, "Using a Template Processor to Simplify Programming" *Research Disclosure, Mason Publications*, Hampshire, GB, vol. 41, No. 413, (Sep. 1, 1998), 1-3.

Heiss, Kurt , ""Oracle Process Manager and Notification Server Administrator's Guide, 10g Release 2 (10.1.2)"", 10g Release 2 (10.1.2) Dec. 2004 XP002449016: Redwood City. CA. USA. Retrieved from the Internet: URL: http://download.oracle.com/docs/cd/B14 [ret'd on Aug. 31, 2007], (Dec. 2004), pp. 1-1 to pp. 1-26 and pp. 3-1 to pp. 3-30.

Accomazzi, Alberto, et al., *Mirroring the Ads Bibliographic Databases, Astronomical Analysis Software and Systems VII, ASP Conference Series*, vol. 145, 1998, pp. 395-399.

Cutler. Ellie, et al., *SCO UNIX in a Nutsell*, O'Reilly & Associates. Inc., Cambridge, MA, Jan. 1994, pp. 154-158.

Duquette. William H., et al., *Data Definition and Code Generation in TCL, Ride-Ve '99*, Sydney, Australia, Mar. 23-24, 1999. pp. 1-10.

Bartell. Randy L., et al., *The Mediaxact System—A Framework for Personalized Electronic Commerce Systems, Bell Labs Technical Journal*, vol. 4, Issues 153-173. Apr.-Jun. 1999, pp. 153-173.

Fernandez, Mary, et al., *Silkroute: Trading Between Relations and XML, Computer Networks*, vol. 33 Issues 1-6, Jun. 2000, pp. 723-745.

Hatley, John W., *Automatically Generating Procedure Code and Database Maintenance Scripts, Ingres World*, Chicago, IL, Oct. 2-6, 1994, pp. 1-11.

*Non-Final Office Action* dated Mar. 19, 2008, U.S. Appl. No. 11/322,701, filed Dec. 30, 2005, 12 pgs.

*Microsoft Press, Microsoft Computer Dictionary, 4th Edition*, Redmond, WA, 1999, pp. 123 and 183.

"OA Mailed Feb. 20, 2008 for U.S. Appl. No. 11/322,608", (Feb. 20, 2008), Whole Document.

Mueller, Thomas , et al., *Final Office Action* dated Sep. 2, 2008, U.S. Appl. No. 11/322,701, filed Dec. 30, 2005, 19 pgs.

USPTO, "OA Mailed May 22, 2008 for U.S. Appl. No. 11/322,401", (May 22, 2008), Whole Document.

USPTO, "OA Mailed May 23, 2008 for U.S. Appl. No. 11/322,400", (May 23, 2008), Whole Document.

USPTO, "FOA Mailed Sep. 4, 2008 for U.S. Appl. No. 11/322,608", (Sep. 4, 2008), Whole Document.

USPTO, "OA mailed Jan. 8, 2008 for U.S. Appl. No. 11/322,607", (Jan. 8, 2008), Whole Document.

USPTO, "Office Action mailed Jun. 26, 2008 for U.S. Appl. No. 11/322,607".

*Non-Final Office Action* for U.S. Appl. No. 11/322,509, Mailed Jan. 14, 2009, whole document., Whole Document.

*Non-Final Office Action* for U.S. Appl. No. 11/324,125, Mailed Jan. 23, 2009, whole document., Whole Document.

*Non-Final Office Action* for U.S. Appl. No. 11/322,511, Mailed Jan. 22, 2009, whole document., Whole Document.

*Non-Final Office Action* for U.S. Appl. No. 11/322,608, Mailed Feb. 13, 2009, 10 pages.

*Final Office Action* for U.S. Appl. No. 11/322,401, Mailed Nov. 19, 2008, whole document, Whole Document.

*Non-Final Office Action* for U.S. Appl. No, 11/323,110, Mailed Nov. 26, 2008, whole document., Whole Document.

Feller, Peter H., "Software Process Support Through Software configuration Management", *IEEE*, (1990), 58-60.

Schlee, et al., "Generative Programming of Graphical User Interfaces", ACM, (2004), 403-406.

"U.S. Appl. No. 11/322,400, Notice of Allowance mailed May 18, 2009", 7 pgs.

"U.S. Appl. No. 11/322,401, Advisory Action mailed Feb. 26, 2009", 5 pgs.

"U.S. Appl. No. 11/322,401, Final Office Action mailed Nov. 19, 2008", 7 pgs.

"U.S. Appl. No. 11/322,401, Non Final Office Action mailed May 21, 2009", 10 pgs.

"U.S. Appl. No. 11/322,401, Non Final Office Action mailed May 22, 2008", 7 pgs.

"U.S. Appl. No. 11/322,401, Notice of Allowance mailed Dec. 31, 2009", 4 Pgs.

"U.S. Appl. No. 11/322,401, Preliminary Amendment filed Mar. 16, 2009", 11 pgs.

"U.S. Appl. No. 11/322,401, Response filed Feb. 19, 2009 to Final Office Action mailed Nov. 19, 2008", 7 pgs.

"U.S. Appl. No. 11/322,401, Response filed Aug. 22, 2008 to Non Final Office Action mailed May 22, 2008", 17 pgs.

"U.S. Appl. No. 11/322,401, Response filed 09-16-09 to Non Final Office Action mailed May 21, 2009", 10 pgs.

"U.S. Appl. No. 11/322,607, Non Final Office Action mailed Jan. 8, 2008", 10 pgs.

"U.S. Appl. No. 11/322,608, Final Office Action mailed Jul. 8, 2009", 9 pgs.

"U.S. Appl. No. 11/322,701, Non-Final Office Action mailed Jul. 6, 2009", 15 pgs.

"U.S. Appl. No. 11/323,110 , Notice of Allowance mailed Oct. 20, 2009", 6 pgs.

"U.S. Appl. No. 11/323,110, Non Final Office Action mailed Nov. 26, 2008", 10 pgs.

"U.S. Appl. No. 11/323,110, Notice of Allowance mailed May 29, 2009", 9 pgs.

"U.S. Appl. No. 11/323,110, Response filed Feb. 25, 2009 to Non Final Office Action mailed Nov. 26, 2008", 9 pgs.

"U.S. Appl. No. 11/323,110, Response filed Oct. 27, 2008 to Restriction Requirement mailed Aug. 27, 2008", 10 pgs.

"U.S. Appl. No. 11/323,110, Restriction Requirement mailed Aug. 27, 2008", 7 pgs.

"U.S. Appl. No. 11/323,438, Non Final Office Action mailed Apr. 1, 2009", 21 pgs.

"U.S. Appl. No. 11/323,438, Response filed Jun. 30, 2009 to Non Final Office Action mailed Apr. 1, 2009", 14 pgs.

"U.S. Appl. No. 11/322,701, Non Final Office Action mailed Mar. 19, 2008", 11 pgs.

"J2EE Engine Bootstrap", *BIS Techdev*, printed on Sep. 26, 2005,, [Online]. Retrieved from the Internet: <URL: http://bis.wdf.sap.corp/twiki/bin/view/Techdev/J2EEEngineBootstrap>, 1-15.

Hall, et al., "Design: A Generic Configuration Shell, Proc of the 3rd International Conf. on industrial and engineering applications of artificial intelligence and expert systems", vol. 1, Charleston, SC 1990, (1990), 500-508 pgs.

Karlsson, et al., "Method Configuration: Adapting to situational characteristics while creating reusable assets", *Information and software technology*, vol. 46, Issue 9, (Jul. 1, 2004), 619-633 pgs.

Leffler, et al., "Building Berkeley UNIX Kernels with Config", *Computer Systems research Group*, (Apr. 17, 1991), 2-1 and 2-31 pgs.

Robbins, et al., "Unix in a nutshell", 3rd edition, O'Reily & Associates, Inc, (Aug. 1999), 215-221 and 265-266 pgs.

Schwanke, et al., "Configuration Management in BiiN SMS", *Proc. of the 11th International Conf. on software engineering Pittsburgh*, (383-393 pgs), 1989.

Williams, et al., "Embedded Linux as a platform for dynamically self-reconfiguration systems-ON-CHIP", (21-24 pgs), 163-169 pgs.

"U.S. Appl. No. 11/322,401, Response filed Apr. 14, 2010 to Ex Parte Quayle Action mailed Mar. 30, 2010", 4 pgs.

"U.S. Appl. No. 11/322,401, Notice of Allowance mailed Jun. 1, 2010", 5 pgs.

\* cited by examiner

DYNAMIC ADAPTATION OF A CONFIGURATION TO A SYSTEM ENVIRONMENT

TECHNICAL FIELD

Embodiments of the invention generally relate to the field of computer systems and, more particularly, to a method and apparatus for dynamic adaptation of a configuration to a system environment.

BACKGROUND

In complex computer systems, the development of a configuration for each particular computer environment can be difficult, and is often a matter of experimentation and guesswork to develop a working model. Because a complex system may include many disparate environments, this generally requires repeating the development process numerous times as various systems in different locations are configured.

If a configuration is developed for a system and is found to operate effectively, this generally is of little help for other systems. In a conventional operation, a developer or user may wish to copy a configuration over to another system or to develop a configuration for use in multiple systems, but this is generally not possible because of system dependencies built into the configuration. Certain elements of the configuration will depend on the characteristics of the individual computer systems that are configured, and such characteristics will generally be different for each system that is encountered.

A conventional system configuration is static, and thus is not adaptable to new environments. If a developer or user wishes to copy a working configuration for one system to another system or to develop a configuration for use in multiple computer systems, it is necessary to identify all system dependent configuration elements, to determine how the system dependent configuration elements need to be set to operate in each system, and then to set these configuration elements. Thus, the transfer of a configuration from one system to another is a time-consuming process, and the effort required to correct problems severely limits any advantage that might be gained in copying system configurations or attempting to a common configuration for multiple different systems.

In order to form a conventional configuration process, the elements of the environment need to be placed into the configuration by a system administrator or other person. The process is generally done "by hand" because the required data for the configuration needs to be determined from the system that will receive the configuration, the determined data requires translation into the necessary form for the configuration, and the resulting values must be installed in the correct configuration elements. As a result, the actual formation of the configuration is a complex process.

SUMMARY OF THE INVENTION

A method and apparatus for dynamic adaptation of a configuration to a system environment are described.

In one aspect of the invention, a method includes obtaining system information for a system. The system information is stored in a memory. A setting of an abstract configuration for the system is resolved, with the resolution of the setting being based at least in part on the system information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
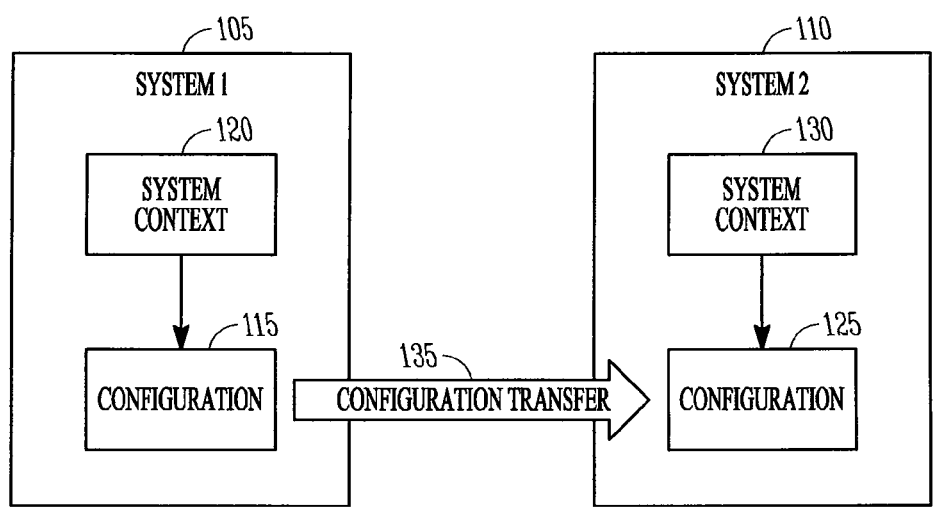
FIG. 1 is an illustration of the transfer of a configuration in an embodiment of the invention.

Embodiments of the invention are generally directed to a method and apparatus for dynamic adaptation of a configuration to a system environment.

As used herein, a "configuration" describes the manner in which a computer system, device, component, or other element, including any hardware, software, or both, is set up. A configuration may include, but is not limited to, the system name, the amount of memory available, the number of CPUs (central processing units) available, and other related information. A configuration may be described in various different ways in different settings, and may have a different name or designation in certain environments. To reduce repetitiveness in this description, a computer system, device, component, or other element may be referred to generally as a computer system or system. In this description, the computer system that receives a configuration may also be referred to as a configuration recipient or configuration consumer.

In an embodiment of the invention, a configuration may be transferred between computer systems. For example, when a configuration has been developed for a system that works well for a certain use, that same configuration may be exported to another system that is different than the first system. In an embodiment, a configuration may be developed or generated for multiple different systems that have differing characteristics. In an embodiment of the invention, a configuration is virtualized for the elements of each system and is adaptable to each system. For example, a software vendor may utilize an embodiment of the invention to develop a self-adapting configuration together with a software product. In this example, the self-adapting configuration may be shipped together with the product in order to minimize configuration overhead for the customer.

In an embodiment of the invention, a system configuration utilizes abstract elements that are not dependent on the characteristics of any particular system. In an embodiment, the abstract elements of a configuration are resolved at run-time to generate values that apply to a particular computer system. As used herein, "abstract" means that an element has a value to be determined that is not tied to a particular system, use, or setting. The value of the element is thus expressed in an abstract fashion, with the value resolvable to a specific value in relation to a particular system that is assigned to the configuration.

In an embodiment of the invention, a system configuration is dynamic, and the determination of the settings for the configuration is based on the nature of each computer system and changes that may occur in a system. A dynamic configuration contrasts with a static configuration in a conventional system, in which the configuration elements need to be modified to work in a particular system. The elements of a dynamic configuration change as the configuration is applied to a system, and may be modified dynamically as the system is modified in order to reflect current values. Thus, in addition to providing for mobility of a configuration, the dynamic values provide for ease in maintenance of the configuration because the elements adapt to reflect the current state of the system.

In a conventional system, it is not generally possible to copy a configuration from one system to another or to generate a configuration that is usable for multiple different computer systems because of system dependencies. A conventional system will utilize a static configuration having set elements, and a static configuration will not transfer from one system to another system in the same form as was used in the original system. In conventional operations, it is necessary to manually modify each of the system dependent configuration elements to make such elements match the new system. Further, because of the system dependencies and the need to create new values for each configuration, there is no assurance in a conventional process that the same configuration will work in the same way in two systems after all of the elements have been set.

In an embodiment of the invention, a configuration is abstracted to eliminate the system dependencies in the configuration. In an embodiment, any system environment dependent settings are removed from a configuration database. Instead of static configuration values, a configuration introduces dynamic elements to reflect any current system. The dynamic elements may include parameters that characterize each system that receives the configuration. Parameters may include, but are not limited to, host names, instance names, the number of CPUs, the amount of available memory, and other hardware and software elements. In an embodiment of the invention, a configuration is dynamic and adapts itself to the system environment, thereby enabling the movement of the configuration from one system environment to another. In an embodiment, the only static settings that may exist in a configuration are non-system dependent settings that thus are not tied to any particular system.

In an embodiment, a configuration element or agent will evaluate abstract configuration elements and substitute the needed values into the configuration to reflect the characteristics of the system that is receiving the configuration. In one embodiment of the invention, a configuration machine or configuration manager will evaluate the abstract configuration elements and determine the values of the configuration elements for the relevant computer system. A configuration machine or manager may be, for example, an API (application program interface) that operates on top of a database for a system. In an embodiment, the configuration manager transparently evaluates the configuration values at run-time to adapt the configuration to the system. However, embodiments of the invention are not limited to any particular component, device, or process for the resolution of configuration elements, but rather include any internal or external agent that can process the configuration elements for a computer system.

In an embodiment of the invention, an abstract configuration may be created using various different processes. In one embodiment, API methods of a configuration manager may be used directly to generate the abstract configuration. In another embodiment a specially tagged property file, such as a JavaProperty file, may be imported into the configuration manager. For example, an enhanced property file may be imported as a property sheet into a configuration database. Other methods of generating the abstract configuration may be utilized, and embodiments of the invention are not limited to any particular generation process.

In an embodiment, system dependencies may include any characteristic of a system that may be found in a configuration. Dependencies may include system identification data, system information such as heap size and number of nodes, and hardware availability such as number of CPUs. Each system dependency is expressed in an abstract form in the virtualized configuration in a manner that does not refer to any particular system. The form of the elements in a virtualized configuration may vary in different embodiments. For example, system dependencies may include parameters that are substituted, parameters that require calculation, parameters that rely on or refer to other values, or other types of direct or indirect values.

In an embodiment of the invention, system configurations may include various default values that are substituted as the values are resolved for a particular computer system. In addition, configuration may be dependent on the intended use of a computer system. Various defaults or settings may be established for different types of uses. The different use cases may be addressed in various ways. In one example, templates, forms, or similar devices may be provided to establish certain parameter values for a configuration.

In an embodiment of the invention, configurations may be structured or developed in multiple levels, with, for example, "higher" levels providing default and abstract elements, which are shippable across system boundaries. In this example, an upper configuration level is applicable to all systems, but may, for instance, be overridden by lower level configuration levels in certain cases.

In one embodiment, below an upper configuration level may be a usage defined level, or template level, that provides configuration elements designed for particular use cases. In an embodiment of the invention a system provides for predefined configurations, which may include the use of templates, forms, or similar devices. The usage defined level may override upper level defaults. In an embodiment, the usage defined level is based on the system usage and not the particular system and thus the elements remain abstract for purposes of evaluation in conjunction with the characteristics of the receiving system. The different use cases may, for example, enable and disable components as needed for the particular use case. In one possible example, a developer may wish to turn off much of a system, minimizing the number of nodes, to maximize the system power available to the developer. In another example, a usage case may require enablement of all server nodes to enable the use of a portal that will carry a large amount of traffic.

In an embodiment of the invention, below the usage defined level may be a system level, which is based on the individual system instance. The system level includes defining the actual system instances belonging to the system. In an embodiment, each system instance derives its configuration from the template level. The settings received from the template level are abstract and dynamically resolved during runtime according to the given system context, which is attached to the system. Thus, in an embodiment of the invention a configuration is self-adapting to the particular system environment. In an embodiment, on the system level customizations might be made that are system specific and thus could be done in a generic or abstract manner on the template level. The system level defines the actual system instances belonging to the system. Each system instance derives its configuration from the template level. These derived settings will still be abstract and dynamically resolved during runtime according to the given system context, which is attached to the system. Thus, the configuration is self-adapting to the particular system environment. On the system level customizations might be done which are system specific and which could not be done in a generic (or abstract) way on the system or template level The system level may further include a custom level above the individual instance, with the custom level providing customization of the configuration for application to a particular site. In an embodiment, an additional modification may exist between the default level and the usage case level to provide customization that affects all use cases. Thus, customization may be done either for all instances at a higher level, or at the individual instance level.

In an embodiment of the invention, a configuration dynamically adapts to a system environment. In an embodiment of the invention, the dynamic adaptation includes obtaining system information for a computer system, storing the system information in a memory for ease of access, and transparently resolving abstract configuration values based at least in part on the stored system information.

In an embodiment, a method is provided for applying the system environment, including the system name, Java home (for a Java system), instance ID, hardware present and available, and other such data to the virtualized configuration. In one embodiment, a process includes taking needed information from the system environment and using such information in resolution of configuration values. In an embodiment, parameter values of an abstract configuration are mapped to actual values determined from the system environment.

In an embodiment of the invention, a system context contains basic parameters that characterize the system, which may include the system name, the host name, memory, and other items. The system context exists outside the configuration database, which does not any system dependencies. System dependencies are abstracted by referencing the parameters from the system context, and the parameters are dynamically resolved during runtime.

In an embodiment, certain settings within the configuration database may be more complex, and may depend on each other. For example, a maxHeap size depends on a setting for the number of server nodes (e.g. maxheap=memory/number_of nodes.). Further, other settings stored somewhere else in the database might be dependent on the maxHeap size configuration. In order to handle these dependencies without redundant configuration, value references (value links) are allowed between different values stored in the configuration database. In order to link to a value, it is necessary to know the location of the value, which thus is a dependency on the location of the value to which there should be a link. If the location changes, the link will no longer work. Thus, in an embodiment of the invention system information (which may be designated as System_Info) is available. "System_info" provides one specified location (such as within the configuration database) where links to useful settings (such as number_of_nodes or maxHeap) may be kept. In this manner, components are capable of linking into the specified system_info configuration, and thus are independent of the physical location of the setting that is referenced. In an embodiment of the invention, there is an advantage because the information there may be assurance that the data will be in the specified location in the system information, whereas there is no such assurance in the internal structure. In an embodiment, system context contains low level system parameters, while system information contains the higher level parameters that may be calculated out of system context parameters, and that might be of general interest for other component configurations and thus referenced In an embodiment, data that may normally be scattered throughout the system structure may provided in a centralized format.

In an embodiment, a process for dynamic adaptation of a system environment includes:

(1) The system context is initialized.

(2) System information is generated to provide links for useful settings.

(3) For each parameter in the configuration list, the appropriate value is obtained from the system environment. The process for obtain such values may vary depending on the type of data that is involved. For instance, the process may be broken down into different cases such as:

(a) Pure values that can be obtained from the instance profile. These are values that exist in the instance profile generated during installation in the file system (b) Values that require a combination of values from existing system values. In such a case, the necessary values may be obtained by linking to the system information. In one example, the full name of an instance may require the combination of various values that describe the instance. For instance, a full instance name (which may have a parameter $FULL_INSTANCE_NAME) may be D70_JC20_pcjee01, in which D70 is the system name, JC20 is the instance name, and pcjee01 is the instance host.

(c) Pure operating system parameters, such as the number of CPU's that are available and the amount of memory available. These are values that are determined or limited by the operating system and thus data needs to be obtained from the OS. For example, if there are more than one instance that will be placed in a single box or unit, then the number of CPUs available for a particular instance is less than the number that physically present in the box. In this case, the value returned from the OS may be multiplied by a factor (between 0 and 1) that is configured within the instance profile. In another example, if an instance is virtualized such that it is spread over multiple boxes, i.e., the hardware for the instance is not limited to a particular physical unit, then the number of CPUs available may be greater than the number present in a device.

(4) The configuration process continues with resolution of the elements of the configuration. In an embodiment of the invention, when it is time to resolve elements of the abstract configuration, each parameter of the configuration is isolated and the system context is queried for the necessary value. In an embodiment, the system information will contain the data needed for the configuration.

In an embodiment of the invention, the system information is stored in main memory. Main memory is relatively fast, thereby enabling a quick configuration process. In an embodiment of the invention, it is only necessary to go to the main memory for the system context data. Whenever the system is changed, this will be reflected in the system information stored in main memory.

In an embodiment of the invention, the technical configuration of a Java system is simplified through the use of virtualized and adaptive configuration. Embodiments of the invention may be described herein in terms of Java objects and processes. However, embodiments of the invention are not limited to any particular system environment. Embodiments of the invention may be applied to any computer environment which includes the use of a configuration or similar structure with one or more system dependent elements.

The architectures and methodologies discussed above may be implemented with various types of computing systems such as an application server that includes a Java 2 Enterprise Edition ("J2EE") server that supports Enterprise Java Bean ("EJB") components and EJB containers (at the business layer) and/or Servlets and Java Server Pages ("JSP") (at the presentation layer). Other embodiments may be implemented in the context of various different software platforms including, by way of example, Microsoft.NET, Windows/NT, Microsoft Transaction Server (MTS), the Advanced Business Application Programming ("ABAP") platforms developed by SAP AG, and other computer platforms.

FIG. 1 is an illustration of the transfer of a configuration in an embodiment of the invention. In this illustration, a first computer system (system 1 105) has a particular configuration 115 that is based at least in part on the system context 120, which includes such elements as the system name, the instance host name, the number of CPUs, the amount of memory available, and other related system factors.

A second computer system (system 2 110) also contains a configuration 125 that is based at least in part on the system context 130 of the second system 110. If the configuration 115 of the first system 105 has been developed and would be useful in the second system, then there is an incentive to transfer the configuration 135 and thus to re-use the development efforts that went into generating the configuration 115. However, in a conventional process, a configuration generally cannot not be easily copied or transferred because the elements of the configuration are based on the specific system context 120 of the first system 105. In order to perform the transfer of the configuration, the resulting configuration 125 for the second system 110 would have to be modified and corrected to match the system context 130 of the second system 110, which may be a very time consuming process.

In an embodiment of the invention, a configuration is developed as a virtualized, adaptable configuration that is based on abstract configuration data, and that does not contain any system dependent elements. In this embodiment, the abstract configuration may be provided to the second system 110. The elements of the abstract configuration would be resolved based on the system context 130 of the second system 130 to form the configuration 125 for the second system 110. In an embodiment, it is possible to transfer 135 an adaptable configuration 115 of the first system 105 to the second system 110, or to develop a configuration that is usable in both systems. The abstract and adaptable nature of such virtualized configuration allows for transfer without first making corrections and modifications to the configuration.

In an embodiment of the invention, the transferred configuration 125 will be automatically resolved, such as through use of a configuration machine or engine. The automatic resolution process may include the transformation of any indirect references, calculated references, and other parameters as needed to match the system context 130 of the second system 110.

Figure 2:
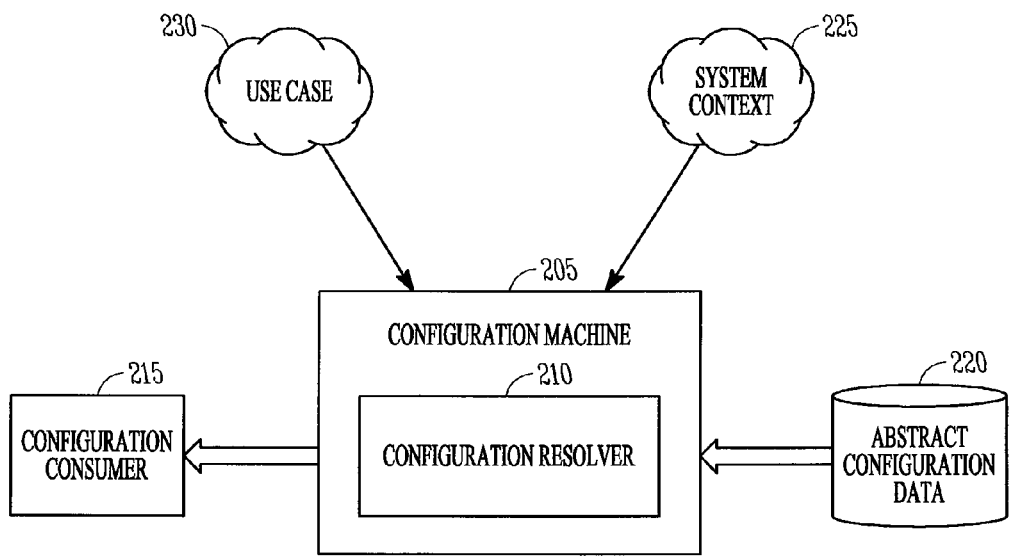
FIG. 2 is an illustration of an embodiment of a system for generation of a configuration.

FIG. 2 is an illustration of an embodiment of a system for generation of a configuration. In this illustration, a configuration machine 205 is used to provide a configuration to a consumer of the configuration 215. The consumer may be any component, device, or system that requires a configuration for a particular use. In an embodiment of the invention, a database includes abstract configuration data 220, the abstract data being configuration elements that are not tied to any particular system, but rather are adaptable to a system that receives the configuration. For example, the same abstract configuration data may be used in multiple different systems even though the systems have different system characteristics that require different configuration elements.

In an embodiment of the invention, a configuration machine 205 includes a configuration resolver 210. The configuration machine 205 receives the abstract configuration data 220 and the configuration resolver 210 resolves the elements of the abstract configuration data to apply to a particular system, in this case including the configuration consumer 215. The configuration is resolved based at least in part on the system context 225 of the relevant system, which includes relevant data regarding the particular system 215 that is to receive the configuration.

In an embodiment of the invention, a configuration may also be based on the particular use case intended for the system 230. Thus, the configuration may be formed based at least in part on the particular use case of the configuration consumer 215. The use case may provide certain system default elements that are designed for particular uses of a system.

Figure 3:
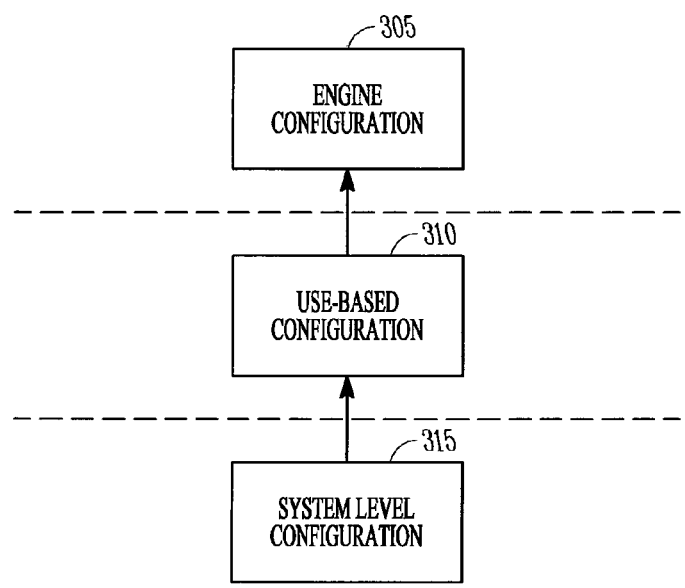
FIG. 3 is an illustration of an embodiment of configuration development.

FIG. 3 is an illustration of an embodiment of configuration development. In an embodiment of the invention, a configuration may be developed in levels, with upper levels providing defaults that may be overridden in lower levels. In an embodiment of the invention, a configuration may inherit elements from upper levels. In one example, an engine level configuration 305 may represent a basic default configuration that is not designed for any particular use or system. The configuration may include abstract elements that are structured as required for a configuration engine or machine that will resolve the elements for a particular system.

In this example, a use-based (or template) configuration level 310 then defines configurations that are based at least in part on an intended use for a system. This level may provide settings that are appropriate for a particular purpose, which may then be modified as appropriate. In one example, the use-based configuration level may provide that a certain number of nodes be turned on for the purpose of a particular use case.

A system level configuration 315 inherits a configuration from the use-based configuration level. In some instances, the configuration may be further customized at the system level. The system level defines the actual system instances belonging to the system, with each system instance deriving its configuration from the template level. The derived settings remain abstract and are dynamically resolved during runtime according to the given system context attached to the system. In this manner, a configuration is self-adapting to the particular system environment. On the system level, customizations may be implemented that are system specific, and that could not be accomplished in a generic or abstract manner in an engine level or template level configuration.

Figure 4:
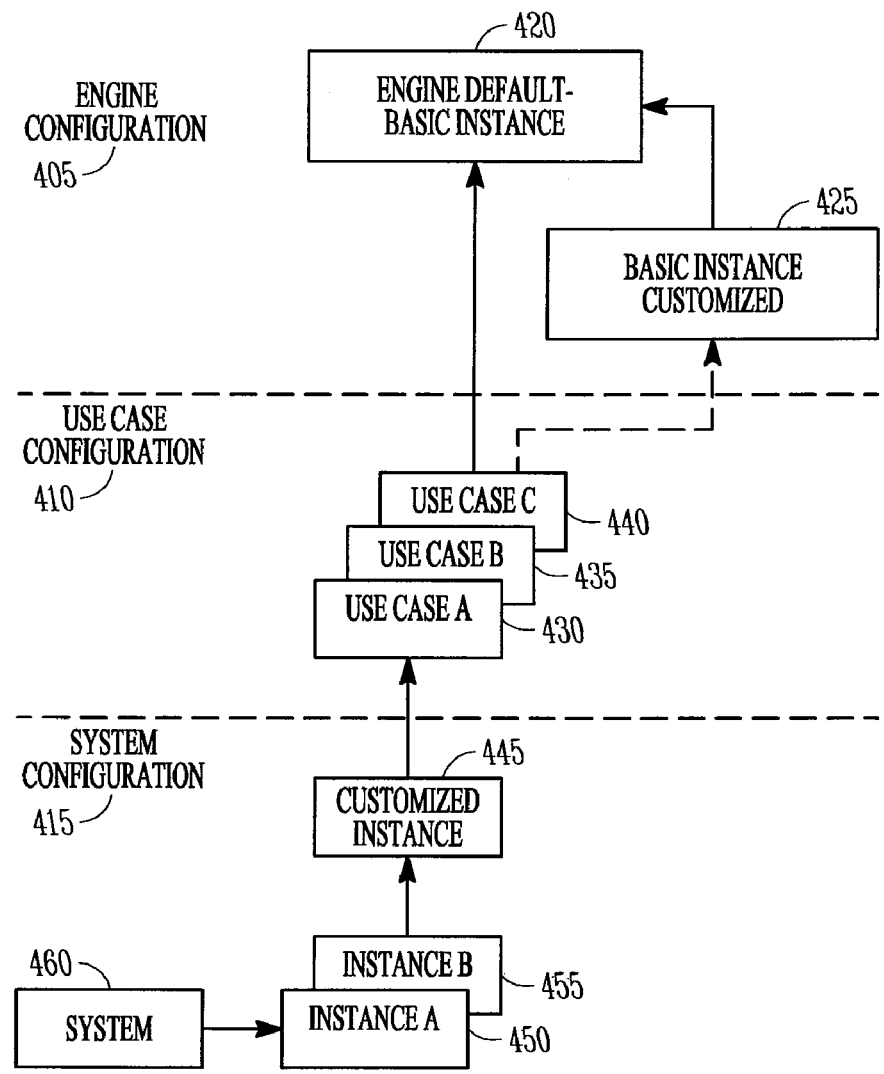
FIG. 4 is an illustration of an embodiment of configuration development.

FIG. 4 is an illustration of an embodiment of configuration development. In FIG. 4 a particular example of configuration development is described, but embodiments of the invention are not limited to this particular structure.

In this illustration, an engine configuration level 405 is illustrated. At this level a configuration engine default configuration is formed 420, which provides a basic instance of the configuration. The basic instance is a virtualized configuration that is abstract and is not tied to any particular system or used case. In one example, a customization of the basic instance 425 may be provided, such customization providing a possible modification of all configuration instances for a system regardless of the particular use of the system.

Also illustrated in FIG. 4 is a use case configuration, the use case providing the configuration for various different uses of a system, which are illustrated here as Use Case A 430, Use Case B 435, and Use Case C 440. Each use case provides a template or form for a configuration for a particular use of a system. The use case configuration remains an abstract level that is not tied to a particular system.

A system configuration is also illustrated, including one or more different configuration instances, such as Instance A 450 and Instance B 455. In an embodiment of the invention, the context information for the configuration instances will be accessed in the system context. In an embodiment, the system configurations contain information about the instances that are part of the system, and may further include customizations that could not be defined on an abstract level. In this illustration, the system configuration may also include a customized instance 445, which provides customization for instances received for various different use cases. In other embodiments, there may be multiple customized instances, depending on the particular type of configuration being established.

Figure 5:
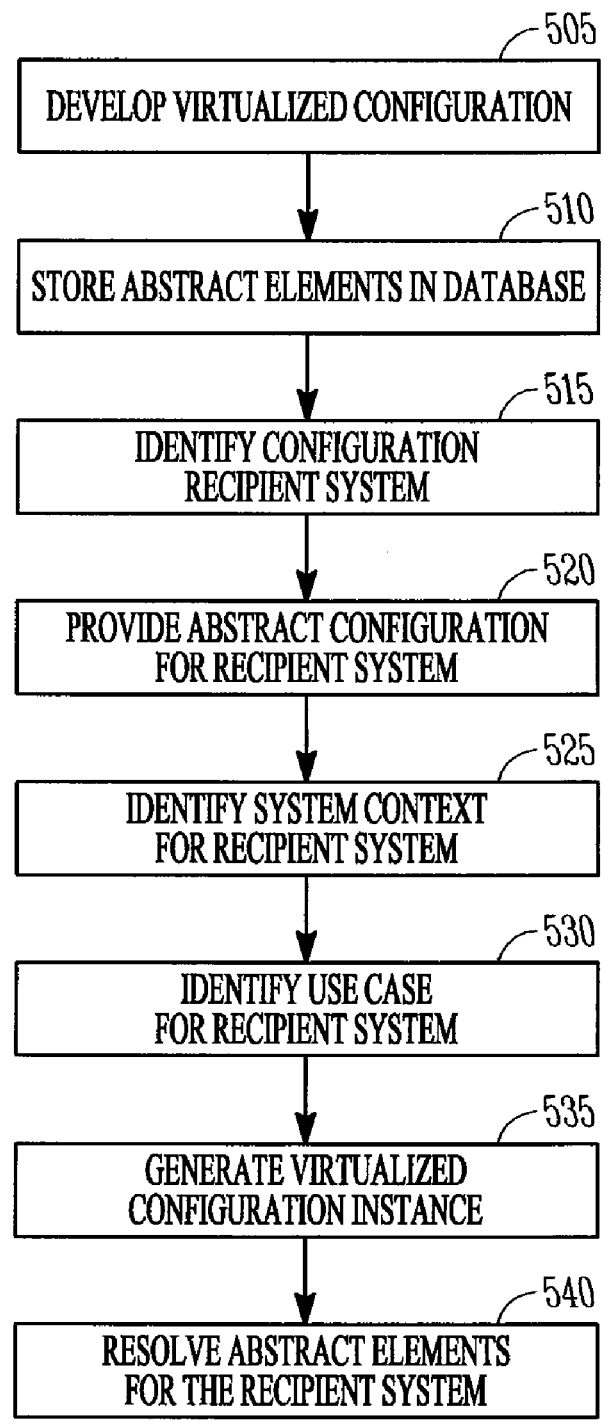
FIG. 5 is a flowchart to illustrate an embodiment of configuration generation.

FIG. 5 is a flowchart to illustrate an embodiment of configuration generation. In this illustration, a virtualized configuration is developed 505, the virtualized configuration including one or more abstract elements that are not tied to any particular computer system. In an embodiment, the virtualized configuration is adaptable, with the abstract elements intended to be resolved to reflect appropriate values for a system that is receiving a configuration.

In this illustration, the abstract elements may be stored in a database 510, although the process of building up a configuration may vary in different embodiments of the invention. A recipient system for the configuration is identified 515, and an abstract configuration is provided for the recipient system 520. A configuration engine or other agent may be responsible for generating the configuration and resolving the abstract elements of the configuration. As a part of this process, the system context is identified for the recipient system 525, which thus provides the characteristics of the system for purposes of resolving the configuration elements. A use case may also be identified 530, which may be applicable if a form or template is available to establish a customized configuration.

A virtualized configuration instance is then generated 535. The configuration engine resolves the abstract elements of the configuration instance for the recipient system 540. In this manner, the configuration adapts to the recipient system, with resolution taking place during runtime within the recipient system.

Figure 6:
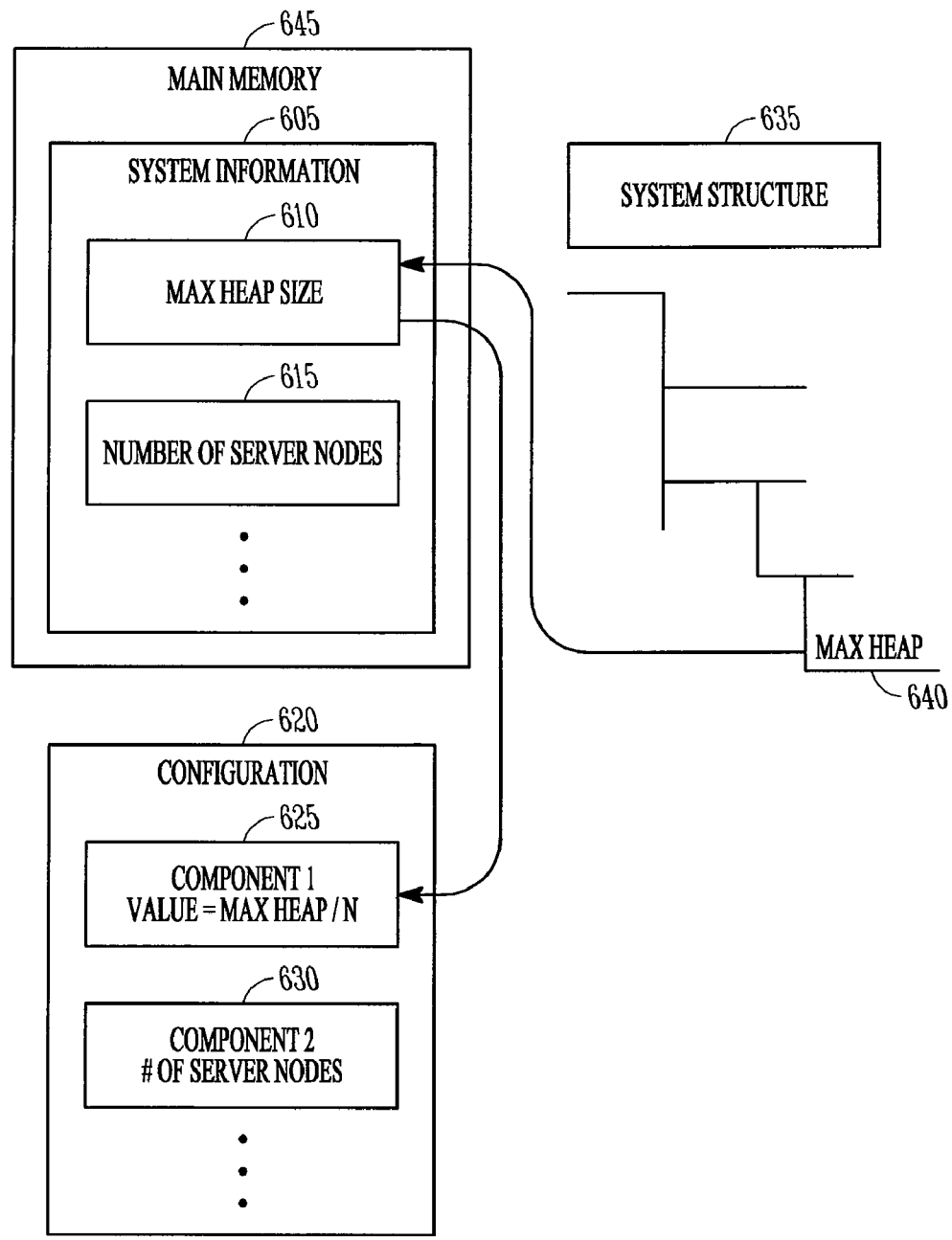
FIG. 6 is an illustration of an embodiment of dynamic adaptation of a configuration to a system environment.

FIG. 6 is an illustration of an embodiment of dynamic adaptation of a configuration to a system environment. In this illustration, a set of system information 605 contains data obtained from a system structure 635 for use in generating a configuration 620.

In an embodiment of the invention, the system information 605 may include, for instance, a max heap size 610 (the heap in general being an area of memory that is reserved for data created at runtime, and whose size thus cannot be predetermined) and a number of server nodes for the system 615. Numerous other elements may also be included in the system information. In an embodiment, the system information 605 is intended to contain the data that is needed by the configuration 620.

In an example, the configuration 620 may include a Component 1 625 that utilizes the max heap size, such as in a calculation, and may include a Component 2 630 that requires the number of nodes for the system. In this example, the max heap size 640 may be present in the deep structure of the system 635, and thus is difficult to locate and retrieve. However, the data has been stored in the system information 605, where the data is easily accessible for Component 1 625.

In an embodiment of the invention, the system information 605 is stored in main memory 645. The use of main memory allows quick access to the system information, thereby increasing the efficiency of the configuration process. However, embodiments of the invention are not limited to the storage of system context in main memory, but rather include any internal external storage of the system context that is available for use for a configuration.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method comprising:
   receiving a virtual configuration that includes an abstract ent resolvable to a specific element,
      the receiving being from a first system and performed by a second system,
      the virtual configuration being generated by the first system based on an abstract configuration accessed by the first system, on a customization specific to multiple systems that include the second system, and on a use case applicable to the second system,
      the abstract configuration including a set of abstract elements that includes the abstract element resolvable to the specific element,
      the customization being a version of the abstract configuration,
      the use case being a version of the customization,
      the specific element corresponding to the second system and being derivable based on the abstract element and on a system context of the second system;
   resolving the abstract element to the specific element by deriving the specific element based on the abstract element and on the system context of the second system,
      the resolving being performed by a configuration resolver that is included in a configuration machine embodied in the second system; and
   storing the virtual configuration in a memory of the second system.

2. The method of claim 1, wherein the resolving of the abstract element to the specific element occurs at a run-time of a task that is associated with the virtual configuration.

3. The method of claim 1, wherein the virtual configuration is generated by the first system based on the system context of the second system, the system context of the second system being accessible by the first system.

4. The method of claim 1, wherein the virtual configuration is generated by the first system based on a use case that is applicable to the second system, the use case being a version of the abstract configuration and accessible by the first system.

5. The method of claim 4, wherein the use case includes a number, the number representing a quantity of nodes to be turned on in accordance with the use case.

6. The method of claim 1, wherein the customization and the use case are accessible by the first system.

7. The method of claim 1, wherein the resolving of the abstract element to the specific element includes obtaining a value pertinent to the abstract element from an operating system that is executing on the second system.

8. A system comprising:
   a memory configured to store a virtual configuration that includes an abstract element resolvable to a specific element,
   the virtual configuration being generated by a further system based on an abstract configuration accessed by the further system, on a customization specific to multiple systems that include the system, and on a use case applicable to the system,
   the abstract configuration including a set of abstract elements that includes the abstract element resolvable to the specific element,
   the customization being a version of the abstract configuration,
   the use case being a version of the customization,
   the specific element corresponding to the system and being derivable based on the abstract element and on a system context of the system; and
   a configuration engine configured to:
      receive the virtual configuration from the further system;
      resolve the abstract element to the specific element by deriving the specific element based on the abstract element and on the system context of the system; and
      store the virtual configuration in the memory.

9. The system of claim 8, wherein the configuration engine is configured to resolve the abstract element to the specific element at a run-time of a task that is associated with the virtual configuration.

10. The system of claim 8, wherein the virtual configuration is generated by the further system based on the system context of the system, the system context of the system being accessible by the further system.

11. The system of claim 8, wherein the virtual configuration is generated by the further system based on a use case that is applicable to the system, the use case being a version of the abstract configuration and accessible by the further system.

12. The system of claim 11, wherein the use case includes a number, the number representing a quantity of nodes to be turned on in accordance with the use case.

13. The system of claim 8, wherein the customization and the use case are accessible by the further system.

14. The system of claim 8, wherein the configuration engine, in resolving the abstract element to the specific element, is configured to obtain a value pertinent to the abstract element from an operating system that is executing on the system.

15. The system of claim 14, wherein the configuration engine, in resolving the abstract element to the specific element, is configured to modify the value obtained from the operating system.

16. The system of claim 14, wherein the configuration engine, in resolving the abstract element to the specific element, is configured to query the system context of the system based on the abstract element.

* * * * *